United States Patent
Yao et al.

(10) Patent No.: US 10,138,357 B2
(45) Date of Patent: Nov. 27, 2018

(54) RESIN COMPOSITION AND RESIN SHAPED PRODUCT

(71) Applicant: FUJI XEROX CO., LTD., Tokyo (JP)

(72) Inventors: Kenji Yao, Minamiashigara (JP); Masahiro Moriyama, Minamiashigara (JP); Manabu Kawashima, Minamiashigara (JP); Masaya Ikuno, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 69 days.

(21) Appl. No.: 15/365,419

(22) Filed: Nov. 30, 2016

(65) Prior Publication Data

US 2017/0081505 A1    Mar. 23, 2017

Related U.S. Application Data

(62) Division of application No. 14/616,380, filed on Feb. 6, 2015, now Pat. No. 9,605,140.

(30) Foreign Application Priority Data

Sep. 26, 2014 (JP) .................... 2014-197376
Sep. 26, 2014 (JP) .................... 2014-197379

(51) Int. Cl.
*C08L 1/14*    (2006.01)
*C08L 1/10*    (2006.01)

(52) U.S. Cl.
CPC .. *C08L 1/14* (2013.01); *C08L 1/10* (2013.01)

(58) Field of Classification Search
CPC ..................................... C08L 1/10; C08L 1/14
See application file for complete search history.

(56) References Cited

U.S. PATENT DOCUMENTS

| | | | |
|---|---|---|---|
| 2004/0175575 A1 | 9/2004 | Sugiura | |
| 2006/0280882 A1 | 12/2006 | Oka et al. | |
| 2011/0152818 A1 | 6/2011 | Wang et al. | |
| 2013/0150501 A1* | 6/2013 | Basu | C08L 1/12 524/41 |
| 2013/0220173 A1* | 8/2013 | Sharma | C08L 1/00 106/143.1 |
| 2014/0039435 A1 | 2/2014 | Wang et al. | |

FOREIGN PATENT DOCUMENTS

| | | |
|---|---|---|
| CN | 1526754 A | 9/2004 |
| CN | 102665635 A | 9/2012 |
| JP | H08-510782 A | 11/1996 |
| JP | 2014-084343 A | 5/2014 |

OTHER PUBLICATIONS

Dec. 28, 2017 Office Action issued in Chinese Patent Application No. 2015101115878.
Apr. 19, 2018 Office Action issued in Japanese Patent Application No. 2014-197376.
Apr. 19, 2018 Office Action issued in Japanese Patent Application No. 2014-197379.

* cited by examiner

*Primary Examiner* — Arrie L Reuther
(74) *Attorney, Agent, or Firm* — Oliff PLC

(57) ABSTRACT

According to an exemplary embodiment of the present invention, there is provided a resin composition containing a cellulose ester resin, a compound containing an adipic acid ester, and a maleic anhydride-modified ethylene-vinyl acetate copolymer and a resin composition containing a cellulose ester resin, a compound containing an adipic acid ester, and a polyhydroxyalkanoate resin.

9 Claims, No Drawings

RESIN COMPOSITION AND RESIN SHAPED PRODUCT

CROSS-REFERENCE TO RELATED APPLICATION(S)

This application is a divisional application of U.S. patent application Ser. No. 14/616,380 filed Feb. 6, 2015, which in turn claims foreign priority to Japanese Patent Application Nos. 2014-197376 filed on Sep. 26, 2014 and 2014-197379 filed on Sep. 26, 2014. The disclosure of the prior applications is hereby incorporated by reference herein in their entirety.

BACKGROUND

1. Field

The present invention relates to a resin composition and a resin shaped product.

2. Description of the Related Art

Conventionally, various resin compositions containing a cellulose ester resin have been provided and used for manufacturing various resin shaped products.

SUMMARY

According to one aspect of the invention, there is provided a resin composition, containing: a cellulose ester resin; a compound containing an adipic acid ester; and a maleic anhydride-modified ethylene-vinyl acetate copolymer.

DETAILED DESCRIPTION

Hereinafter, an exemplary embodiment of the present invention will be described. The following explanation and examples are simply an example of the present invention and do not limit the scope of the present invention.

In a case for explaining an amount of each component in a composition, when a plurality of material is present in a component, the amount of the component means a sum of the plurality of materials unless otherwise mentioned.

<Resin Composition>

A resin composition of a first aspect of exemplary embodiments of the present invention contains a cellulose resin, a compound containing an adipic acid ester and a maleic anhydride-modified ethylene-vinyl acetate copolymer (referred to as "maleic anhydride-modified EVA resin"). The resin composition of the first aspect of the present invention contains the cellulose ester resin as the main component. The main component means a component having the largest content (by weight) among components contained in the resin composition.

The cellulose ester resin generally has a poor thermoplastic property since a melt viscosity is not lowered even when being heated. Thus, a resin composition made from the cellulose ester resin alone has a low flowability and poor moldability.

When a plasticizer having a good affinity with the cellulose ester resin and a low melt viscosity is blended with the cellulose ester resin, thermoplastic property is imparted. In the cellulose ester resin, although melt viscosity is lowered as an amount of the plasticizer is large, thermoplastic property is improved, that is flowability of the resin is enhanced. However, when a plasticizer is blended, a warpage deformation under a condition of a high temperature and a high humidity is occurred in a resin shaped product in some cases due to difference between shrinking ratios of the cellulose ester resin and the plasticizer.

When the compound containing an adipic acid ester and the maleic anhydride-modified EVA resin are blended to the cellulose ester resin, there can be provided a resin composition capable of obtaining a resin shaped product which can suppress warpage deformation under a condition of high temperature and high humidity (for example, temperature of 60° C. and humidity of 85 RH %). This reason has not been cleared, but the following reason may be assumed.

Initially, when the maleic anhydride-modified EVA resin is blended with the cellulose ester resin, since the maleic anhydride-modified EVA resin has a low melt viscosity at the same temperature compared to the cellulose ester resin, thermoplastic property is artificially enhanced.

Further, when blending the compound containing an adipic acid ester as a plasticizer with the cellulose ester resin, the maleic anhydride-modified EVA resin absorbs the compound containing an adipic acid ester. Due to this absorption, the cellulose ester resin and the maleic anhydride-modified EVA resin, which have a small difference in shrinking ratio from each other, are partially reacted to become a uniformed state. By this, the difference in shrinking ratios between the cellulose ester resin and the compound containing an adipic acid ester (plasticizer) is eased, and then a warpage deformation under a condition of a high temperature and a high humidity may be suppressed.

In view of the above, the resin composition of the first aspect of exemplary embodiments of the present invention is capable of obtaining a resin shaped product which can suppress a warpage deformation under a condition of a high temperature and a high humidity (for example, temperature of 60° C. and humidity of 85 RH %) by having the above configuration. Also, the resin composition of the first aspect of exemplary embodiments of the present invention has a high thermoplastic property (flowability) and an excellent moldability.

A resin composition of a second aspect of exemplary embodiments of the present invention contains a cellulose resin, a compound containing an adipic acid ester and a polyhydroxyalkanoate resin. The resin composition of the second aspect of the present invention contains the cellulose ester resin as the main component. The main component means a component having the largest content (by weight) among components contained in the resin composition.

As explained above, the cellulose ester resin generally has a poor thermoplastic property since a melt viscosity is not lowered even when being heated. Thus, a resin composition made from the cellulose ester resin alone has a low flowability and poor moldability.

When a plasticizer having a good affinity with the cellulose ester resin and a low melt viscosity is blended with the cellulose ester resin, thermoplastic property is imparted. In the cellulose ester resin, although melt viscosity is lowered as an amount of the plasticizer is large, thermoplastic property is improved, that is flowability of the resin is enhanced. However, due to effects of temperature, humidity and lapsed time, a phenomenon (bleeding) that a plasticizer is precipitated on the surface of a pellet of the resin composition or the resin shaped product occurs in some cases. Also, in some cases, elastic modulus of the pellet of the resin composition or the resin shaped product is deteriorated.

Thus, an amount of the plasticizer is limited. And, in the limited amount of the plasticizer, plastic property (flowability) of the resin composition containing the cellulose ester resin is insufficient, and thereby a temperature when the resin composition is kneaded and molded becomes high. In this case, decomposition of the cellulose ester resin occurs, and the pellet of the resin composition or the resin shaped product is colored in brown.

When the compound containing an adipic acid ester and the polyhydroxyalkanoate resin are blended to the cellulose ester resin, there can be provided a resin composition capable of obtaining a resin shaped product which can suppress coloring in brown. This reason has not been cleared, but the following reason may be assumed.

Initially, when the compound containing an adipic acid ester is blended with the cellulose ester resin, the compound containing an adipic acid ester serves as a plasticizer, and thermoplastic property (flowability) is developed.

Further, when blending the polyhydroxyalkanoate with this system, the polyhydroxyalkanoate is dissolved into the compound containing an adipic acid ester, and then a hyper-order structure having a large free volume, which is near spherical shape, is formed in the compound containing an adipic acid ester. By this, thermoplastic property (flowability) is enhanced. Therefore, it can be achieved that a temperature when the resin composition is kneaded and molded is lowered, and the decomposition of the cellulose ester resin is suppressed.

In view of the above, the resin composition of the second aspect of exemplary embodiments of the present invention is capable of obtaining a resin shaped product which can suppress coloring in brown. Also, the resin composition of the second aspect of exemplary embodiments of the present invention has a high thermoplastic property (flowability) and an excellent moldability. Further, the resin composition of the second aspect of exemplary embodiments of the present invention has a high thermoplastic property (flowability) even when the compound containing an adipic acid ester is not excessively blended, and therefore has a high heat resistance.

Hereinafter, components of the resin shaped product of exemplary embodiments of the present invention will be described.

[Cellulose Ester Resin]

The resin composition of exemplary embodiments of the present invention contains a cellulose ester resin. Examples of the cellulose ester resin include a cellulose ester resin represented by formula (1).

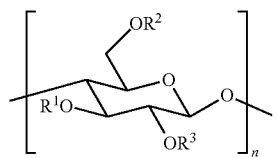

Formula (1)

In formula (1), $R^1$, $R^2$ and $R^3$ each independently represent a hydrogen atom or an acyl group having 1 to 3 carbon atoms. n represents an integer of 1 or more.

Examples of an acyl group represented by $R^1$, $R^2$ and $R^3$ include an acetyl group, a propionyl group, a butyryl group and the like. In terms of improvement of transparency and tensile fracture energy property of the resin shaped product, an acyl group is preferably an acetyl group.

In formula (1), a range of n is not particularly limited. However, the range is preferably 250 or more and 750 or less, and more preferably 350 or more and 600 or less. When n is 250 or more, a strength of the resin shaped product tends to be enhanced. When n is 750 or less, degradation of flexibility of the resin shaped product tends to be suppressed. Thus, when n falls within the range, tensile fracture energy property is further enhanced.

Here, the phrase "$R^1$, $R^2$ and $R^3$ each independently represent an acyl group" means that at least one portion of hydroxyl group in the cellulose ester resin represented by formula (1) is acylated.

That is, all $R^1$'s contained in the cellulose ester resin may be the same or different or a part of $R^1$'s contained in the cellulose ester resin may be the same. $R^2$'s and $A^3$'s are similar to $R^1$'s.

A substitution degree of the cellulose ester resin is preferably 2.1 or more and 2.6 or less, and more preferably 2.2 or more and 2.5 or less.

When the substitution degree is 2.6 or less, a crystallization of the cellulose ester resin may be suppressed, and thereby a thermoplastic property may be easily developed. Thus, when the substitution degree falls within the above range, transparency and tensile fracture energy property of the resin shaped product are further improved. Also, a moldability of the resin composition is further improved.

Meanwhile, the substitution degree is an index showing a degree of acylation of the cellulose ester resin. Specifically, the substitution degree means an average number of substitution of 3 hydroxyl group of a glucopyranose unit in the cellulose ester resin by an acyl group in a molecular.

Here, in terms of improvement of transparency and tensile fracture energy property of the resin shaped product, the cellulose ester resin preferably has an acetyl group as an acyl group in which $R^1$, $R^2$ and $R^3$ each independently represent and has a substitution degree of 2.1 or more and 2.6 or less.

A weight average molecular weight (Mw) of the cellulose ester resin is preferably 100,000 or more and 300,000 or less, and more preferably 150,000 or more and 200,000 or less, in terms of improvement of transparency and tensile fracture energy property of the resin shaped product. The weight average molecular weight may be measured in the same manner as in a method for measuring a weight average molecular weight of the polyether ester compound.

Hereinafter, specific examples of the cellulose ester resin will be shown, but the cellulose ester resin is not limited thereto.

TABLE 1

| No. | Name of Compound | Product Name | Manufacturer | Substitution $R^1$, $R^2$ and $R^3$ | Substitution Degree |
|---|---|---|---|---|---|
| CE1 | Compound 1 | diacethyl cellulose | L-50 | Daicel Corporation | hydrogen atom or acetyl group | 2.5 |
| CE2 | Compound 2 | diacethyl cellulose | L-20 | Daicel Corporation | hydrogen atom or acetyl group | 2.5 |
| CE3 | Compound 3 | diacethyl cellulose | L-50 reforming product | Daicel Corporation | hydrogen atom or acetyl group | 2.4 |
| CE4 | Compound 4 | diacethyl cellulose | L-50 reforming product | Daicel Corporation | hydrogen atom or acetyl group | 2.0 |
| CE5 | Compound 5 | diacethyl cellulose | L-20 reforming product | Daicel Corporation | hydrogen atom or acetyl group | 2.4 |
| CE6 | Compound 6 | cellulose triacetate | LT-55 | Daicel Corporation | hydrogen atom or acetyl group | 2.7 |

TABLE 1-continued

| No. | Name of Compound | Product Name | Manufacturer | Substitution $R^1$, $R^2$ and $R^3$ | Substitution Degree |
|---|---|---|---|---|---|
| CE7 | Compound 7 cellulose acetate propionate | CAP482-20 | Eastman Chemical Company | hydrogen atom, acetyl group or propionyl group | 2.6 |
| CE8 | Compound 8 cellulose acetate butylate | CAB381-0.1 | Eastman Chemical Company | hydrogen atom, acetyl group or propionyl group | 2.6 |

[Compound Containing Adipic Acid Ester]

The resin composition of exemplary embodiments of the present invention contains a compound containing an adipic acid ester. Here, the compound containing an adipic acid ester means a compound of an adipic acid ester alone or a mixture of an adipic acid ester and another component than the adipic acid ester (compound different from the adipic acid ester). However, the compound containing an adipic acid ester preferably contains an adipic acid ester in amount of 50% by mass with respect to the entire components of the compound containing an adipic acid ester.

Examples of an adipic acid ester include an adipic acid diester and an adipic acid polyester. Specifically, the adipic acid diester represented by formula (2-1) and an adipic acid polyester represented by formula (2-2) are exemplified.

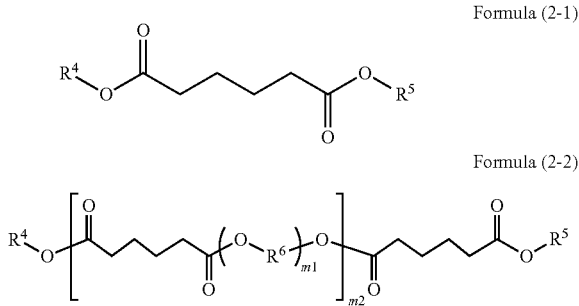

Formula (2-1)

Formula (2-2)

In formulae (2-1) and (2-2), $R^4$ and $R^5$ each independently represent an alkyl group or a polyoxyalkyl group alkylene group ($-C_xH_{2x}-O)y-R^{41}$). Here, $R^{41}$ represents an alkyl group, x represents an integer of 1 to 10 and y represents an integer of 1 to 10.

$R^6$ represents an alkylene group, m1 represents an integer of 1 to 20, and m 2 represents an integer of 1 to 10.

In formulae (2-1) and (2-2), an alkyl group represented by $R^4$ and $R^5$ is preferably an alkyl group having 1 to 6 carbon atoms, and more preferably an alkyl group having 1 to 4 carbon atoms. The alkyl group may be a linear form, a branched form, or a cyclic form. Of those, a linear form and a branched form are preferable.

In formulae (2-1) and (2-2), for a polyoxyalkyl group represented by $R^4$ and $R^5$, an alkyl group represented by $R^{41}$ is preferably an alkyl group having 1 to 6 carbon atoms, and more preferably an alkyl group having 1 to 4 alkyl group.

The alkyl group may be a linear form, a branched form, or a cyclic form. Of those, a linear form and a branched form are preferable.

x is preferably an integer of 1 to 10, and y is preferably an integer of 1 to 10.

In formulae (2-1) and (2-2), an alkylene group represented by $R^6$ is preferably an alkylene group having 1 to 6 carbon atoms, and more preferably an alkylene group having 1 to 4 carbon atoms. The alkylene group may be a linear form, a branched form, or a cyclic form. Of those, a linear form and a branched form are preferable.

In formulae (2-1) and (2-2), the above groups represented by respective signs may be a group substituted by a substituent. Examples of the substituent include an alkyl group, an aryl group and a hydroxyl group.

A molecular weight (or weight average molecular weight) of the adipic acid ester is preferably 200 to 5000, and more preferably 300 to 2000. Meanwhile, the weight average molecular weight may be measured in the same manner as a method for measuring a weight average molecular weight of the cellulose ester resin.

Hereinafter, specific examples of the compound containing an adipic acid ester will be shown, but the compound containing an adipic acid ester is not limited thereto.

| No. | Name of Compound | Name of Product | Manufacturer |
|---|---|---|---|
| ADP 1 | Compound 9 | Adipic acid diester | DAIFATTY-101 | DAIHACHI CHEMICAL INDUSTRY CO., LTD. |
| ADP 2 | Compound 10 | Adipic acid diester | ADEKA CIZER RS-107 | ADEKA CORPORATION |
| ADP 3 | Compound 11 | Adipic acid polyester | POLYCIZER W-230-H | DIC Corporation |

[Maleic Anhydride-Modified Ethylene-Vinyl Acetate Copolymer]

The resin composition of the first aspect of exemplary embodiments of the present invention further contains a maleic anhydride-modified EVA resin (maleic anhydride-modified ethylene-vinyl acetate copolymer) in addition to the cellulose ester resin and the compound containing an adipic acid ester.

The maleic anhydride-modified EVA resin is, for example, an ethylene-vinyl acetate copolymer graft-modified by a maleic anhydride. The maleic anhydride-modified EVA resin may be obtained by, for example, grafting a maleic anhydride on the ethylene-vinyl acetate copolymer and using organic peroxides or a radical generated by thermal decomposition method or the like as a starting material.

The maleic anhydride-modified EVA resin preferably has a density of 0.9 to 0.94 and a melting point of 90° C. to 100°

C., and more preferably a density of 0.91 to 0.93 and a melting point of 92° C. to 98° C.

When the density of the resin is 0.9 to 0.94 and the melting point is 90° C. to 100° C., reactivity of the maleic anhydride-modified EVA resin to a hydroxyl group of the cellulose ester resin tends to be enhanced. Also, lowering in flowability of the resin composition is suppressed, and thereby thermoplastic property tends to be developed. Accordingly, when the density and the melting point of the maleic anhydride-modified EVA resin fall within the above range, warpage deformation of the resin shaped product is further suppressed. Also, moldability of the resin is further improved.

The density of the maleic anhydride-modified EVA resin may be measured by the hydrometry in accordance with JIS K 0061 (2001). The melting point of the maleic anhydride-modified EVA resin may be measured by the method in accordance with JIS K 7121 (2012).

Hereinafter, specific examples of the maleic anhydride-modified EVA resin will be shown, but the maleic anhydride-modified EVA resin is not limited thereto.

Here, "$R^6$ represent an alkylene group in formula (3)" means 1) that formula (3) includes the same [O—$R^6$—C(=O)—] structure in which $R^6$'s are the same or 2) that formula (3) includes a plurality of [O—$R^6$—C(=O)—] structure in which $R^6$'s are different in carbon number or branched state.

That is, the polyhydroxyalkanoate resin may be a polymer in which one kind of hydroxyalkanoate (hydroxyalkanoic acid) is singly polymerized or may be a copolymer in which two or more kinds of hydroxyalkanoate (hydroxyalkanoic acid) are copolymerized.

Examples of hydroxyalkanoic acid for forming the polyhydroxyalkanoate resin include a lactic acid, 2-hydroxybutyric acid, 3-hydroxybutyric acid, 4-hydroxybutyric acid, 2-hydroxy-3-methyl-butyric acid, 2-hydroxy-3,3-dimethyl-butyric acid, 3-hydroxyvaleric acid, 4-hydroxy valeric acid, 5-hydroxy valeric acid, 3-hydroxyhexanoic acid, 2-hydroxycaproic acid, 2-hidroxyisocapoic acid, 6-hydroxycapoic acid, 3-hydroxypropionic acid, 3-hydroxy-2,2-dimethylpropionic acid and 2-hydroxy-n-octanoic acid.

| No. | Product Name | Manufacturer | Density | Melting Point (° C.) |
|---|---|---|---|---|
| EVA 1 | Compound 12 | MODIC A543 | Mitsubishi Chemical Corporation | 0.92 | 98 |
| EVA 2 | Compound 13 | MODIC A515 | Mitsubishi Chemical Corporation | 0.95 | 88 |

[Polyhydroxyalkanoate Resin]

The resin composition of the second aspect of exemplary embodiments of the present invention further contains a polyhydroxyalkanoate resin in addition to the cellulose ester resin and the compound containing an adipic acid. Examples of the polyhydroxyalkanoate resin include a polyhydroxyalkanoate resin represented by formula (3).

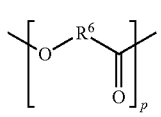

Formula (3)

Here, $R^6$ represents an alkylene group having 1 to 10 carbon atoms, and p represents and integer of 1 or more.

The alkylene group represented by $R^6$ is preferably an alkylene group having 3 to 6 carbon atoms. The alkylene group represented by $R^6$ may be a linear form or a branched form, but is preferably a branched form in terms of improvement of surface glossiness of the resin shaped product and moldability of the resin composition.

In formula (3), a range of p is not particularly limited, but is preferably 10 to 2000, and more preferably 50 to 1000. When p falls within the range of 10 to 2000, surface glossiness of the resin shaped product is further improved. Further, moldability of the resin composition is further improved.

Of these, the polyhydroxyalkanoate resin is preferably a copolymer resin of a branched hydroxyalkanoic acid having 2 to 4 carbon atoms and a branched hydroxylalkanoic acid having 5 to 7 carbon atoms (the carbon number includes a carbon atom contained in a carboxyl group), and more preferably a copolymer resin of 3-hydroxybutyric acid and 3-hydroxycaproic acid (copolymer resin of 3-hydroxybutylate and 3-hydroxyhexanoate). In the case of using this copolymer resin, the polyhydroxyalkanoate resin easily form a fine spherical structure, and surface glossiness of the resin shaped product is further improved. Also, moldability of the resin composition is further improved.

The weight average molecular weight (Mw) of the polyhydroxyalkanoate resin is preferably 10,000 to 500,000, and more preferably 30,000 to 200,000.

When the weight average molecular weight (Mw) falls within the range of 10,000 to 500,000, surface glossiness of the resin shaped product is further improved. Also, moldability of the resin composition is further improved. The weight average molecular weight (Mw) may be measured in the same manner as in the method for measuring the weight average molecular weight of the polyether ester compound.

Hereinafter, specific examples of the polyhydroxyalkanoate resin will be shown, but the polyhydroxyalkanoate resin is not limited thereto.

| | No. | Compound Name | Product Name | Manufacturer | $R^6$ |
|---|---|---|---|---|---|
| PHA 1 | Compound 18 | Copolymer of 3-hydroxy butyric acid and 3-hydroxycaproic acid | AONILEX | Kaneka Corporation | Propylene group/pentylene group [O(C$_3$H$_6$)CO]/[O(C$_5$H$_6$)CO] (Mass ratio = 90/10) |
| PHA 2 | Compound 19 | Polylactic acid | TERRAMAC TE 2000 | UNITIKA LTD. | Methylene group |

-continued

| No. | Compound Name | Product Name | Manufacturer | $R^6$ |
|---|---|---|---|---|
| PHA 3 | Compound 20 | Copolymer of 3-hydroxy butyric acid and 3-hydroxyvaleric acid | BIOPOL 3000 | Monsanto Company | Propylene group/butylene group [O(C$_3$H$_6$)CO]/[O(C$_4$H$_8$)CO] (Mass ratio = 80/20) |

[Amounts of Components in Resin Composition]

An amount of the compound containing an adipic acid ester in the resist composition is preferably 5 to 20 parts by mass, and more preferably 9 to 16 parts by mass, per 100 parts by mass of the cellulose ester resin.

When the amount of the compound containing an adipic acid ester is 5 parts by mass or more, plastic property tends to be enhanced, and therefore coloring of the resin shaped product in brown is further suppressed. When the amount of the compound containing an adipic acid ester is 20 parts by mass or less, warpage deformation of the resin shaped product and coloring of the resin shaped product in brown due to presence of excessive amount of the compound containing an adipic acid ester tends to be suppressed. Further, occurrence of bleeding (precipitation) of the compound containing an adipic acid ester and deterioration in elastic modulus and heat resistance are also suppressed. Accordingly, when the amount of the compound containing an adipic acid ester falls within the above range, warpage deformation of the resin shaped product and coloring of the resin shaped product in brown are further suppressed. Further, occurrence of bleeding, and deterioration in elastic modulus and heat resistance are further suppressed. Furthermore, moldability of the resin composition is further improved.

In the first aspect of exemplary embodiments of the present invention, an amount of the maleic anhydride-modified EVA resin is preferably 2 to 10 parts by mass, and more preferably 2 to 5 parts by mass.

When the amount of the maleic anhydride-modified EVA resin is 2 parts by mass or more, absorption ability of the compound containing an adipic acid ester tends to be enhanced. When the amount of the maleic anhydride-modified EVA resin is 10 parts by mass or less, compatibility thereof with the cellulose ester resin tends to be enhanced. Accordingly, when the amount of the maleic anhydride-modified EVA resin falls within the above range, warpage deformation of the resin shaped product is further suppressed. Also, moldability of the resin composition is further improved.

In the second aspect of exemplary embodiments of the present invention, an amount of the polyhydroxyalkanoate resin is preferably 2 to 10 parts by mass, and more preferably 2 to 5 parts by mass.

When the amount of the polyhydroxyalkanoate resin falls within the range of 2 to 10 parts by mass, coloring of the resin shaped product in brown is further suppressed. Also, moldability of the resin composition is further improved.

A mass ratio of the cellulose ester resin to the total resin composition is preferably 50% by mass to 95% by mass, and more preferably 60% by mass to 90% by mass.

[Other Components]

The resin composition of exemplary embodiments of the present invention may contain other components than the above components, depending on necessity. Examples of the other components include a flame retardant, a compatibilizer, a plasticizer, an antioxidant, a release agent, a light fastness improver, a weathering agent, a coloring agent, a pigment, a reforming agent, a dripping inhibitor, an antistatic agent, a hydrolysis inhibitor, a filler, a reinforcing agent (a glass fiber, a carbon fiber, a talc, a clay, a mica, a glass flake, a milled glass, a glass beads, a crystalline silica, an alumina, a silicon nitride, an alumina nitride, a boron nitride, and the like), and the like. An amount of the other components is 0% by mass to 5% by mass per the entire mass of the resin composition. Here, "0% by mass" means that the other components are not contained in the resin composition.

The resin composition of exemplary embodiments of the present invention may contain a resin other than the above resin. However, an amount of the resin other than the above is preferably contained in an amount of 5% by mass per the total mass of the resin in the resin composition. Examples of such a resin include conventionally known thermoplastic resins, specifically: a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyether imide resin; a polyacetal resin; a polyvinyl acetal resin; a polyketone resin; a polyetherketone resin; a polyetheretherketone resin; a polyarylketone resin; a polyether nitrile resin; a liquid crystalline resin; a polybenzimidazole resin; a polyparabanic acid resin; a vinyl based polymer or a copolymer resin obtained by polymerizing or copolymerizing one or more kind of a vinyl monomer selected from the group consisting of an aromatic alkenyl compound, a methacrylic acid ester, an acrylic acid ester, and a vinyl cyanide compound; a vinyl cyanide/diene/aromatic alkenyl compound copolymer resin, an aromatic alkenyl compound/diene/vinyl cyanide/N-phenylmaleimide copolymer resin, a vinyl cyanide/(ethylene-diene-propylene (EPDM))/aromatic alkenyl compound copolymer resin, a vinyl chloride resin, a chlorinated vinyl chloride resin, and the like. These resins may be used alone or may be used in combination.

[Preparation Method of Resin Composition]

The resin composition of exemplary embodiments of the present invention is prepared by, for example, melting and kneading a mixture of the above components. Separately, the resin composition of exemplary embodiments of the present invention is prepared by dissolving the above components to a solvent. As a melting and kneading method, conventional methods are exemplified. Specifically, a method in which a twin screw extruder, a Henschel mixer, a Bumbary mixer, a single screw extruder, a multiscrew extruder, and a Cokneader, or the like is used is exemplified.

[Resin Shaped Product]

The resin shaped product of exemplary embodiments of the present invention contains the resin composition of exemplary embodiments of the present invention. That is, the resin shaped product of exemplary embodiments of the present invention has the same configuration as the resin composition.

Specifically, the resin shaped product may be obtained by forming the resin composition of exemplary embodiments of the present invention. As a forming method, injection molding, extrusion molding, blow molding, hot press forming, coating forming, casting molding, dipping molding, vacuum forming, transfer molding, or the like may be adopted.

The forming method of the resin shaped product of exemplary embodiments of the present invention is preferably injection molding in terms of high freedom degree in shape. Particularly, in order to obtain a resin shaped product being excellent in transparency and tensile fracture energy property by utilizing moldability (thermoplastic property and flowability) of the resin composition of exemplary embodiments of the present invention, injection molding is preferable. A cylinder temperature in injection molding is, for example, 200° C. to 250° C., and preferably 210° C. to 230° C. A mold temperature in injection molding is, for example, 40° C. to 60° C., and preferably 45° C. to 55° C. Injection molding may be conducted by using a commercially available apparatus such as NEX 150 manufactured by NISSEI PLASTIC INDUSTRIAL CO., LTD, NEX 70000 manufactured by NISSEI PLASTIC INDUSTRIAL CO., LTD, and SE50D manufactured by TOSHIBA MACHINE CO., LTD.

The resin shaped product of exemplary embodiments of the present invention is suitable used for electronic/electrical equipments, office automation equipments, home appliances, automotive interior materials, containers, and the like. More specifically, casing of electronic/electrical equipments or home appliances, various parts of electronic/electrical equipments or home appliances, storage cases of CD-ROM, DVD, or the like, tableware, beverage bottles, wrap films, films, sheets, and the like is exemplified.

EXAMPLE

Hereinafter, the present exemplary embodiment will be described in detail based on Examples, but the invention is not limited to these Examples below.

Further, "parts" indicates "parts by mass" unless otherwise noted.

Examples 1 to 20 and Comparative Examples 1 to 6

[Kneading]
Materials having components shown in Table 1 are placed in a twin screw kneader (TEX41SS, manufactured by TOSHIBA MACHINE CO., LTD) and kneaded at a cylinder temperature of 220° C. to 250° C. to obtain a pellet of a resin composition (hereinafter, referred to as "resin pellet"). Meanwhile, in Table 1, "parts" means "parts by mass".

[Injection Molding]
The obtained pellet is placed in an injection molding machine (PNX 40, manufactured by NISSEI PLASTIC INDUSTRIAL CO., LTD) and injection-molded at a cylinder temperature of 220° C. to 250° C. and a mold temperature of 40° C. to 60° C. to obtain D1 shaped product (length of 60 mm, width 60 mm, and thickness of 1 mm) and D2 shaped product (length of 60 mm, width 60 mm, and thickness of 2 mm).

[Evaluation]
The obtained D1 shaped product, D2 shaped product and resin pellet are evaluated as follows. The results are shown in Table 1.

—Moldability—
Melt flow rate (MFR, g/10 min) of the resin pellet is measured by using a melt indexer (G-01, manufactured by TOYO SEIKI SEISAKU-SHO, LTD.) at a temperature of 230° C. and a load of 21.2 N to evaluate moldability.

—Warpage Deformation Property—
The D1 specimen and D2 specimen are put softly in a thermohygrostat bath set to a temperature of 60° C. and a humidity of 95% RH (ARL-1100-J, manufactured by ESPEC CORP.). After an elapsed time of 72 hours, the D1 specimen and D2 specimen are taken out and put on an aluminum plate. At portion where the edge portion of each of the D1 specimen and D2 specimen is furthest away from the aluminum plate, the gap between the edge portion of D1 specimen or D2 specimen, and the aluminum plate is measured to evaluate warpage deformation property.

TABLE 1

| | Components | | | | | | | | Moldability | Warpage Deformation Property | |
|---|---|---|---|---|---|---|---|---|---|---|---|
| | Cellulose ester resin | | Compound containing adipic acid ester | | Maleic anhydride-modified EVA resin | | Other additives | | (MFR) | D1 | D2 |
| | Kind | Part | Kind | Part | Kind | Part | Kind | Part | (g/10 min) | (mm) | (mm) |
| Ex. 1 | Compound 1 | 100 | Compound 9 | 15 | Compound 12 | 5 | | | 30 | 0.01 | 0.01 |
| Ex. 2 | Compound 1 | 100 | Compound 9 | 10 | Compound 12 | 5 | | | 26 | 0.01 | 0.01 |
| Ex. 3 | Compound 1 | 100 | Compound 9 | 20 | Compound 12 | 5 | | | 42 | 0.02 | 0.02 |
| Ex. 4 | Compound 1 | 100 | Compound 9 | 5 | Compound 12 | 5 | | | 24 | 0.01 | 0.01 |
| Ex. 5 | Compound 1 | 100 | Compound 9 | 22 | Compound 12 | 5 | | | 46 | 0.06 | 0.03 |
| Ex. 6 | Compound 1 | 100 | Compound 9 | 3 | Compound 12 | 5 | | | 20 | 0.01 | 0.01 |
| Ex. 7 | Compound 1 | 100 | Compound 9 | 15 | Compound 12 | 2 | | | 26 | 0.03 | 0.02 |
| Ex. 8 | Compound 1 | 100 | Compound 9 | 15 | Compound 12 | 10 | | | 40 | 0.02 | 0.02 |
| Ex. 9 | Compound 1 | 100 | Compound 9 | 15 | Compound 12 | 1 | | | 16 | 0.08 | 0.03 |
| Ex. 10 | Compound 1 | 100 | Compound 9 | 15 | Compound 12 | 12 | | | 48 | 0.06 | 0.03 |
| Ex. 11 | Compound 2 | 100 | Compound 9 | 15 | Compound 12 | 5 | | | 34 | 0.01 | 0.01 |
| Ex. 12 | Compound 3 | 100 | Compound 9 | 15 | Compound 12 | 5 | | | 28 | 0.01 | 0.01 |
| Ex. 13 | Compound 4 | 100 | Compound 9 | 15 | Compound 12 | 5 | | | 20 | 0.04 | 0.02 |
| Ex. 14 | Compound 5 | 100 | Compound 9 | 15 | Compound 12 | 5 | | | 24 | 0.01 | 0.01 |
| Ex. 15 | Compound 6 | 100 | Compound 9 | 15 | Compound 12 | 5 | | | 20 | 0.07 | 0.03 |
| Ex. 16 | Compound 7 | 100 | Compound 9 | 15 | Compound 12 | 5 | | | 35 | 0.08 | 0.04 |
| Ex. 17 | Compound 8 | 100 | Compound 9 | 15 | Compound 12 | 5 | | | 38 | 0.07 | 0.03 |
| Ex. 18 | Compound 1 | 100 | Compound 10 | 15 | Compound 12 | 5 | | | 28 | 0.01 | 0.01 |
| Ex. 19 | Compound 1 | 100 | Compound 11 | 15 | Compound 12 | 5 | | | 26 | 0.01 | 0.01 |
| Ex. 20 | Compound 1 | 100 | Compound 9 | 15 | Compound 13 | 5 | | | 22 | 0.03 | 0.02 |
| Comp. Ex. 1 | Compound 1 | 100 | Compound 9 | 15 | | | | | 7 | 0.25 | 0.13 |

TABLE 1-continued

| | Components | | | | | | | Moldability | Warpage Deformation Property | |
|---|---|---|---|---|---|---|---|---|---|---|
| | Cellulose ester resin | | Compound containing adipic acid ester | | Maleic anhydride-modified EVA resin | | Other additives | | (MFR) | D1 | D2 |
| | Kind | Part | Kind | Part | Kind | Part | Kind | Part | (g/10 min) | (mm) | (mm) |
| Comp. Ex. 2 | Compound 1 | 100 | | | Compound 12 | 5 | | | 10 | 0.28 | 0.16 |
| Comp. Ex. 3 | Compound 1 | 100 | Compound 9 | 25 | | | Compound 14 | 14 | 25 | 0.25 | 0.14 |
| Comp. Ex. 4 | Compound 1 | 100 | | | Compound 12 | 5 | Compound 15 | 15 | 12 | 0.31 | 0.19 |
| Comp. Ex. 5 | Compound 1 | 100 | | | Compound 12 | 5 | Compound 16 | 15 | 15 | 0.25 | 0.12 |
| Comp. Ex. 6 | Compound 1 | 100 | | | Compound 12 | 5 | Compound 17 | 15 | 16 | 0.24 | 0.13 |

It is apparent from the above results that Examples directed to the first aspect of exemplary embodiments of the present invention are superior in both moldability (MFR) and warpage deformation property to Comparative Examples.

Examples 21 to 41 and Comparative Examples 7 to 13

[Kneading]

Materials having components shown in Table 2 are placed in a twin screw kneader (TEX41SS, manufactured by TOSHIBA MACHINE CO., LTD) and kneaded at a kneading temperature (cylinder temperature) shown in Table 2 to obtain a pellet of a resin composition (hereinafter, referred to as "resin pellet"). Meanwhile, in Table 2, "parts" means "parts by mass".

[Injection Molding]

The obtained pellet is placed in an injection molding machine (PNX 40, manufactured by NISSEI PLASTIC INDUSTRIAL CO., LTD) and injection-molded at a molding temperature (cylinder temperature) and a mold temperature, both shown in Table 2 to obtain D2 shaped product (length of 60 mm, width 60 mm, and thickness of 2 mm), and ISO dumbbell test specimens (length for the test portion is 100 mm, width for the test portion is 10 mm, and a thickness of 4 mm).

[Evaluation]

The obtained D2 specimens and ISO dumbbell test specimens are evaluated as follows. The results are shown in Table 2.

—Degree of Coloring in Brown—

Hazen color number (APHA) of the D2 shaped product is measured by using a spectrophotometer (TZ6000, manufactured by NIPPON DENSHOKU INDUSTRIES Co., LTD.) to evaluate degree of coloring in brown.

—Heat Resistance—

Load deflection temperature HDT (° C.) of the ISO dumbbell test specimens by using HDT measurement apparatus (HDT-3, manufactured by TOYO SEIKI SEISAKU-SHO, LTD.) under a load condition of 1.8 MPa in accordance with ISO-75 to evaluate heat resistance.

TABLE 2

| | Components | | | | | | | | Kneading temperature | Molding temperature | Mold temperature | Degree of coloring in brown | Heat resistance (HDT) |
|---|---|---|---|---|---|---|---|---|---|---|---|---|---|
| | Cellulose ester resin | | Compound containing adipic acid ester | | Polyhydroxyalkanoate resin | | Other additives | | | | | | |
| | Kind | Part | Kind | Part | Kind | Part | Kind | Part | (° C.) | (° C.) | (° C.) | (APHA) | (° C.) |
| Ex. 21 | Comp. 1 | 100 | Comp. 9 | 15 | Comp. 18 | 5 | | | 200 | 200 | 40 | 180 | 95 |
| Ex. 22 | Comp. 1 | 100 | Comp. 9 | 10 | Comp. 18 | 5 | | | 200 | 200 | 40 | 180 | 101 |
| Ex. 23 | Comp. 1 | 100 | Comp. 9 | 20 | Comp. 18 | 5 | | | 190 | 190 | 40 | 160 | 88 |
| Ex. 24 | Comp. 1 | 100 | Comp. 9 | 5 | Comp. 18 | 5 | | | 200 | 200 | 40 | 210 | 103 |
| Ex. 25 | Comp. 1 | 100 | Comp. 9 | 22 | Comp. 18 | 5 | | | 190 | 190 | 40 | 150 | 82 |
| Ex. 26 | Comp. 1 | 100 | Comp. 9 | 3 | Comp. 18 | 5 | | | 210 | 210 | 40 | 280 | 103 |
| Ex. 27 | Comp. 1 | 100 | Comp. 9 | 15 | Comp. 18 | 5 | | | 200 | 200 | 40 | 190 | 105 |
| Ex. 28 | Comp. 1 | 100 | Comp. 9 | 15 | Comp. 18 | 5 | | | 200 | 200 | 40 | 170 | 81 |
| Ex. 29 | Comp. 1 | 100 | Comp. 9 | 15 | Comp. 18 | 5 | | | 210 | 210 | 40 | 290 | 105 |
| Ex. 30 | Comp. 1 | 100 | Comp. 9 | 15 | Comp. 18 | 5 | | | 190 | 190 | 40 | 210 | 74 |
| Ex. 31 | Comp. 2 | 100 | Comp. 9 | 15 | Comp. 18 | 5 | | | 200 | 200 | 40 | 180 | 93 |
| Ex. 32 | Comp. 3 | 100 | Comp. 9 | 15 | Comp. 18 | 5 | | | 200 | 200 | 40 | 180 | 95 |
| Ex. 33 | Comp. 4 | 100 | Comp. 9 | 15 | Comp. 18 | 5 | | | 210 | 210 | 40 | 260 | 95 |
| Ex. 34 | Comp. 5 | 100 | Comp. 9 | 15 | Comp. 18 | 5 | | | 200 | 200 | 40 | 190 | 94 |
| Ex. 35 | Comp. 6 | 100 | Comp. 9 | 15 | Comp. 18 | 5 | | | 220 | 220 | 40 | 350 | 98 |
| Ex. 36 | Comp. 7 | 100 | Comp. 9 | 15 | Comp. 18 | 5 | | | 190 | 190 | 40 | 210 | 78 |
| Ex. 37 | Comp. 8 | 100 | Comp. 9 | 15 | Comp. 18 | 5 | | | 190 | 190 | 40 | 220 | 75 |
| Ex. 38 | Comp. 1 | 100 | Comp. 10 | 15 | Comp. 18 | 5 | | | 200 | 200 | 40 | 190 | 93 |
| Ex. 39 | Comp. 1 | 100 | Comp. 11 | 15 | Comp. 18 | 5 | | | 200 | 200 | 40 | 200 | 94 |
| Ex. 40 | Comp. 1 | 100 | Comp. 9 | 15 | Comp. 19 | 5 | | | 210 | 210 | 40 | 320 | 96 |
| Ex. 41 | Comp. 1 | 100 | Comp. 9 | 15 | Comp. 20 | 5 | | | 210 | 210 | 40 | 330 | 95 |
| Comp. Ex. 7 | Comp. 1 | 100 | Comp. 9 | 15 | | 5 | | | 240 | 240 | 40 | 650 | 105 |
| Comp. Ex. 8 | Comp. 1 | 100 | Comp. 9 | 40 | | 5 | | | 190 | 190 | 60 | 220 | 45 |
| Comp. Ex. 9 | Comp. 1 | 100 | | | Comp. 18 | 5 | | | 220 | 220 | 40 | 310 | 98 |
| Comp. Ex. 10 | Comp. 1 | 100 | Comp. 9 | 25 | | 5 | Comp. 14 | 14 | 230 | 230 | 40 | 550 | 78 |

TABLE 2-continued

| | Components | | | | | | | Kneading temper- ature (° C.) | Molding temper- ature (° C.) | Mold temper- ature (° C.) | Degree of coloring in brown (APHA) | Heat resistance (HDT) (° C.) |
|---|---|---|---|---|---|---|---|---|---|---|---|---|
| | Cellulose ester resin | | Compound containing adipic acid ester | | Polyhydroxyal- kanoate resin | | Other additives | | | | | |
| | Kind | Part | Kind | Part | Kind | Part | Kind | Part | | | | | |
| Comp. Ex. 11 | Comp. 1 | 100 | | | Comp. 18 | 5 | Comp. 15 | 15 | 250 | 250 | 40 | 540 | 89 |
| Comp. Ex. 12 | Comp. 1 | 100 | | | Comp. 18 | 5 | Comp. 16 | 15 | 240 | 240 | 40 | 600 | 82 |
| Comp. Ex. 13 | Comp. 1 | 100 | | | Comp. 18 | 5 | Comp. 17 | 15 | 240 | 240 | 40 | 520 | 80 |

It is apparent from the above results 2 that Examples directed to the second aspect of exemplary embodiments of the present invention are superior in degree of coloring in brown and heat resistance to Comparative Examples.

The kinds of the materials shown in Tables 1 and 2 are as follows.

Compounds 1 to 8: See the specific examples of the cellulose ester resin

Compounds 9 to 11: See the specific examples of the compound containing an adipic acid ester Compounds 12 to 13: See the specific examples of the maleic anhydride-modified EVA resin Compound 14: Thermoplastic elastomer containing alkylester (meth)acrylate unit and having core-shell structure (thermoplastic elastomer containing methyl methacrylate-n-butyl acrylate copolymer and having core-shell structure, KURARITY LA2250, produced by KURARAY CO., LTD.)

Compound 15: Polyester polyol (Polylite ODX-2692, produced by DIC Corporation)

Compound 16: Diethyl phthalate (DEP, produced by DAIHACHI CHEMICAL INDUSTRY CO., LTD.)

Compound 17: Triphenyl phosphate (TPP, produced by DAIHACHI CHEMICAL INDUSTRY CO., LTD.)

Compounds 18 to 20: See the specific examples of the polyhydroxyalkanoate resin

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. A resin composition comprising:
   a cellulose ester resin;
   a compound containing an adipic acid ester; and
   a polyhydroxyalkanoate resin.
2. The resin composition according to claim 1, wherein the cellulose ester resin is represented by formula (1):

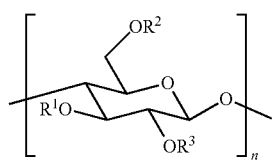

formula (1)

wherein $R^1$, $R^2$ and $R^3$ each independently represent a hydrogen atom or an acyl group having 1 to 3 carbon atoms, and
n represents an integer of 1 or more.

3. The resin composition according to claim 2,
wherein the cellulose ester resin represented by formula (1) has an acetyl group as the acyl group each independently represented by $R^1$, $R^2$ and $R^3$, and
a substitution degree of acetyl group is 2.1 to 2.6.

4. The resin composition according to claim 1,
wherein the polyhydroxyalkanoate resin is represented by formula (3):

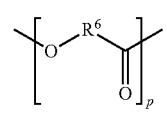

formula (3)

wherein $R^6$ represents an alkylene group having 1 to 10 carbon atoms, and
p represents an integer of 1 or more.

5. The resin composition according to claim 1,
wherein the polyhydroxyalkanoate resin is a copolymer of 3-hydroxyl butylate and 3-hydroxy hexanoate.

6. The resin composition according to claim 1,
wherein an amount of the compound containing an adipic acid ester is 5 to 20 parts by mass per 100 parts by mass of the cellulose ester resin.

7. The resin composition according to claim 1,
wherein an amount of the polyhydroxyalkanoate resin is 2 to 10 parts by mass per 100 parts by mass of the cellulose ester resin.

8. The resin composition according to claim 1, wherein a mass ratio of the cellulose ester resin to a total mass of the resin composition is 50% by mass to 95% by mass.

9. A resin shaped product comprising the resin composition according to claim 1.

* * * * *